US009747541B2

(12) United States Patent
Wable

(10) Patent No.: US 9,747,541 B2
(45) Date of Patent: Aug. 29, 2017

(54) REFLOW SOLDERING-COMPATIBLE INTEGRATED RFID BARCODE LABEL

(71) Applicant: Girish Wable, St. Petersburg, FL (US)

(72) Inventor: Girish Wable, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 0 days.

(21) Appl. No.: 15/131,313

(22) Filed: Apr. 18, 2016

(65) Prior Publication Data

US 2016/0307092 A1 Oct. 20, 2016

Related U.S. Application Data

(60) Provisional application No. 62/148,506, filed on Apr. 16, 2015, provisional application No. 62/167,688, filed on May 28, 2015.

(51) Int. Cl.
*G06K 19/077* (2006.01)
(52) U.S. Cl.
CPC . *G06K 19/07758* (2013.01); *G06K 19/07773* (2013.01)

(58) Field of Classification Search
None
See application file for complete search history.

(56) References Cited

FOREIGN PATENT DOCUMENTS

CA 2345883 A1 * 7/2002

* cited by examiner

*Primary Examiner* — Kristy A Haupt
(74) *Attorney, Agent, or Firm* — Barnes & Thornburg LLP; Thomas J. McWilliams

(57) ABSTRACT

A surface mount technology (SMT)-compatible barcode-printable radio frequency identification (RFID) label that can be attached to a printed circuit board (PCB) work piece for tracking the work piece through an assembly line that includes at least one reflow solder process. The label is constructed from materials and components that function consistently and accurately after being exposed to the high temperature of the reflow solder process, and may further include shielding material to mitigate radio frequency interference. Preferably, the label is configured to be programmed and printed on using an RFID printer.

17 Claims, 6 Drawing Sheets

REFLOW SOLDERING-COMPATIBLE INTEGRATED RFID BARCODE LABEL

RELATED APPLICATIONS

The present disclosure claims priority to U.S. Provisional Application No. 62/148,506, entitled "REFLOW SOLDERING-COMPATIBLE INTEGRATED RFID BARCODE LABEL," filed Apr. 16, 2015 and U.S. Provisional Patent Application No. 62/167,688, entitled "REFLOW SOLDERING-COMPATIBLE INTEGRATED RFID BARCODE LABEL," filed May 28, 2015, the contents of which is incorporated by reference in its entirety herein.

BACKGROUND

Reflow soldering is the most common method of attaching surface mount components to a printed circuit board (PCB) in a typical lead-free surface mount technology (SMT) assembly line. In reflow soldering, a solder paste (a sticky mixture of powdered solder and flux) is used to stick electrical components to their electrically conductive contact pads on the PCB. The entire PCB assembly (PCBA) is then heated in a controlled environment to melt the solder, followed by cooling to solidify and permanently connect the joint. Heating may be accomplished, for example, by passing the assembly through a reflow oven or under an infrared lamp. Several such stages may be needed to completely assemble a complex PCBA. Several such stages typically entail heating the work piece to a maximum temperature of about 260° C. (500° F.) for about 10 seconds. Other high-stress SMT manufacturing line processes and environments include BGA/CSP rework, which heats the work piece to about 150° C. when it is in close proximity to the BGA; and the location of the BGA to a maximum temperature of about 260° C. (500° F.) for about 10 seconds, wave/selective wave soldering, which heats the work piece to about 120° C. where the barcode labels are expected; and aqueous cleaning, which takes place at about 70° C. (160° F.). Thus, reflow soldering generally involves the most hostile environment a PCBA experiences in an SMT assembly line, so any component that can withstand multiple reflow soldering stages can be expected to tolerate well anything else the rest of the assembly line requires.

Radio frequency identification (RFID) technology is sometimes used to track PCBs through the assembly line. RFID components and systems are known that can withstand multiple reflow soldering stages and continue to function consistently and accurately. Such an RFID system generally includes an RFID package that contains a silicon based integrated circuit (IC, or "chip") for wireless communication functionality, electrically coupled to an RFID antenna. Of course, the RFID package must be made of material and have a structure suitable to withstand solder reflow process temperatures as well as shield the internal systems of the component from radio frequency interference and catastrophic damage from parasite signals from other components on the board or from the environment other than those intended by the user to communicate with the internal systems of the component. Such a package may take the form of an SMT component mounted on a PCB. Alternatively, the RFID elements may be mounted directly on the PCB as a bare die; or a combination RFID solution that includes both may be used. For example, FIG. 1 shows an exemplary RFID chip 110 coupled to an RFID antenna 120. As shown, the antenna elements are co-planar with the ground plane of the PCB 130 and were formed when the PCB was manufactured, and the RFID chip 110 was mounted on the board at a later time, such as after the PCB is introduced into an SMT assembly line.

Such SMT process compatible RFID solutions can be coupled to PCBs to track them through the PCBA manufacturing process. Thereafter, the completed PCBA is generally incorporated into a product. As the product is being assembled, after the PCBA is incorporated its RFID chip can also be used to track the product through the rest of its manufacturing process, as well as its boxing and shipping processes. In some cases, an RFID chip may be part of the bill of materials (BOM) of a PCBA to provide a required a design function, such as payment or data transfer. If so, it may be possible to also use that chip for tracking. Otherwise RFID components may be specifically designed and included on the board just for tracking.

There will often be some time between the PCB being placed at the beginning of the assembly line until the RFID is added, during which time RFID cannot be used to track the PCB because it hasn't been added yet. To track the PCB from the beginning of the line, a barcode label may be added to the board before or at the time it is loaded on the SMT line. RFID labels with printable surfaces on which barcodes can be printed onsite are available, but they cannot withstand anything remotely close to reflow temperatures, and so cannot be used in an SMT assembly line that includes reflow soldering. High temperature RFID barcode tags also exist that can withstand reflow temperatures, but they are bulky, expensive, and cannot be printed onsite.

Manufacturers are also working toward an RFID solution in which an RFID chip is embedded inside the PCB. An illustrative example of this approach is shown in FIG. 2. As shown, RFID package (1) is inserted into a cavity formed in the PCB (2), to provide a PCB with RFID (3). Illustratively, the cavity in the PCB may be formed during or after the board is manufactured, and the RFID package would be mounted in the board at a later time, such as after the PCB is introduced into an SMT assembly line. When such a solution becomes available, the embedded RFID could be used to track the PCB after the point in the assembly line where the RFID chip (1) is mounted in the board or prior to it being introduced in the SMT line if it is embedded by the PCB fabricator.

Whenever an RFID solution is to be included in or on a PCB, it must be provided for in the original design of the PCB assembly. That is, an RFID solution cannot be added after the PCB is manufactured, at least because the PCB wasn't designed to accommodate it and there won't be any space on the PCB for it. This will also be true for embedded RFID when it becomes available. Moreover, embedding an RFID chip in a fully functional complex PCB board is still a few years away from being a commercially viable, robust technology with accepted design rules, proven cost benefits, and demonstrated reliability. Overcoming these challenges cannot be accomplished simply by modifying existing PCB board designs, but will require significant new investment and development.

SUMMARY

A printable barcode label containing an RFID chip and antenna, able to withstand the temperature of multiple reflow soldering processes and being able to shield the internal systems of the component from radio frequency interference and catastrophic damage from parasite signals from other components on the board or from the environment other than those intended by the user to communicate with the internal systems of the component for tracking PCBs through an SMT assembly line.

In an illustrative embodiment, a label is fabricated with an integrated RFID chip mounted on a substrate with an antenna either plated on or etched into the substrate. The RFID components including a shielding material are then packaged with layers of inlay materials able to withstand multiple exposures to reflow solder temperatures, as well as normal ambient exposure conditions and providing the shielding required to avoid radio frequency interference or catastrophic failures from parasite signals from other components on the board or from the environment other than those intended by the user to communicate with the internal systems of the component. The top surface of the label is printable, and a barcode may be printed on it using a conventional barcode printer.

In another illustrative embodiment, a label is fabricated on a substrate by printing RFID elements including shielding materials on the substrate with special purpose inks. An all-printed RFID circuit may be created using conducting or semiconducting inks. The semiconducting inks can include small molecule materials such as pentacene, inorganic semiconductors such as silicon precursors, solution processable metals or metal oxides such as silver or silver oxides, and/or polymer semiconducting materials such as polythiophene. An all-printed antenna and shielding layer coupled to the RFID circuit may be created using other ink materials such as (but not limited to) metal filled epoxies, carbon nanotubes, graphene, polyaniline, and/or conducting polymers. Other layers can be fabricated on the substrate to create the RFID label. As before, the top surface of the label is printable, and a barcode may be printed on it preferably using a conventional barcode printer.

It is to be understood that both the foregoing general description and the following detailed description are exemplary and explanatory and are intended to provide further explanation of the disclosure.

BRIEF DESCRIPTION OF THE DRAWINGS

The accompanying drawings are included to provide a further understanding of the disclosure, and are incorporated in and constitute a part of this specification. The drawings illustrate disclosed embodiments and/or aspects and, together with the description, serve to explain the principles of the disclosure.

In the drawings.

DETAILED DESCRIPTION

It is to be understood that the figures and descriptions provided herein may have been simplified to illustrate aspects that are relevant for a clear understanding of the herein described processes, machines, manufactures, and/or compositions of matter, while eliminating, for the purpose of clarity, other aspects that may be found in typical devices, systems, and methods. Those of ordinary skill in the pertinent art may recognize that other elements and/or steps may be desirable and/or necessary to implement the devices, systems, and methods described herein. Because such elements and steps are well known in the art, and because they do not facilitate a better understanding of the present disclosure, a discussion of such elements and steps may not be provided herein. However, the present disclosure is deemed to inherently include all such elements, variations, and modifications to the described aspects that would be known to those of ordinary skill in the pertinent art.

Figure 1:
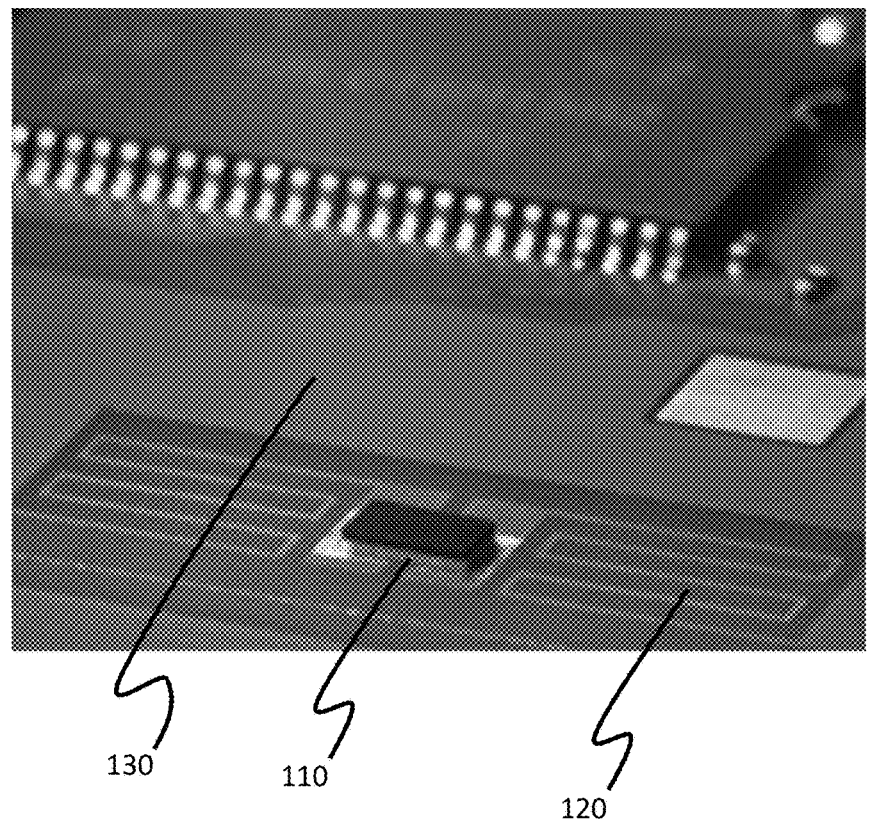
FIG. 1 shows RFID elements on the surface of a PCB.
Figure 2:
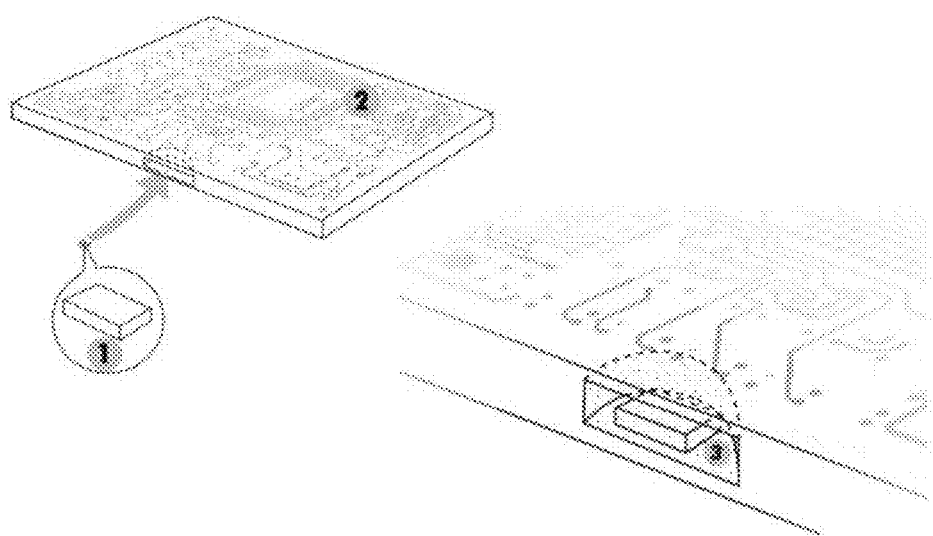
FIG. 2 illustrates an RFID chip embedded in a PCB under an embodiment.
Figure 3:
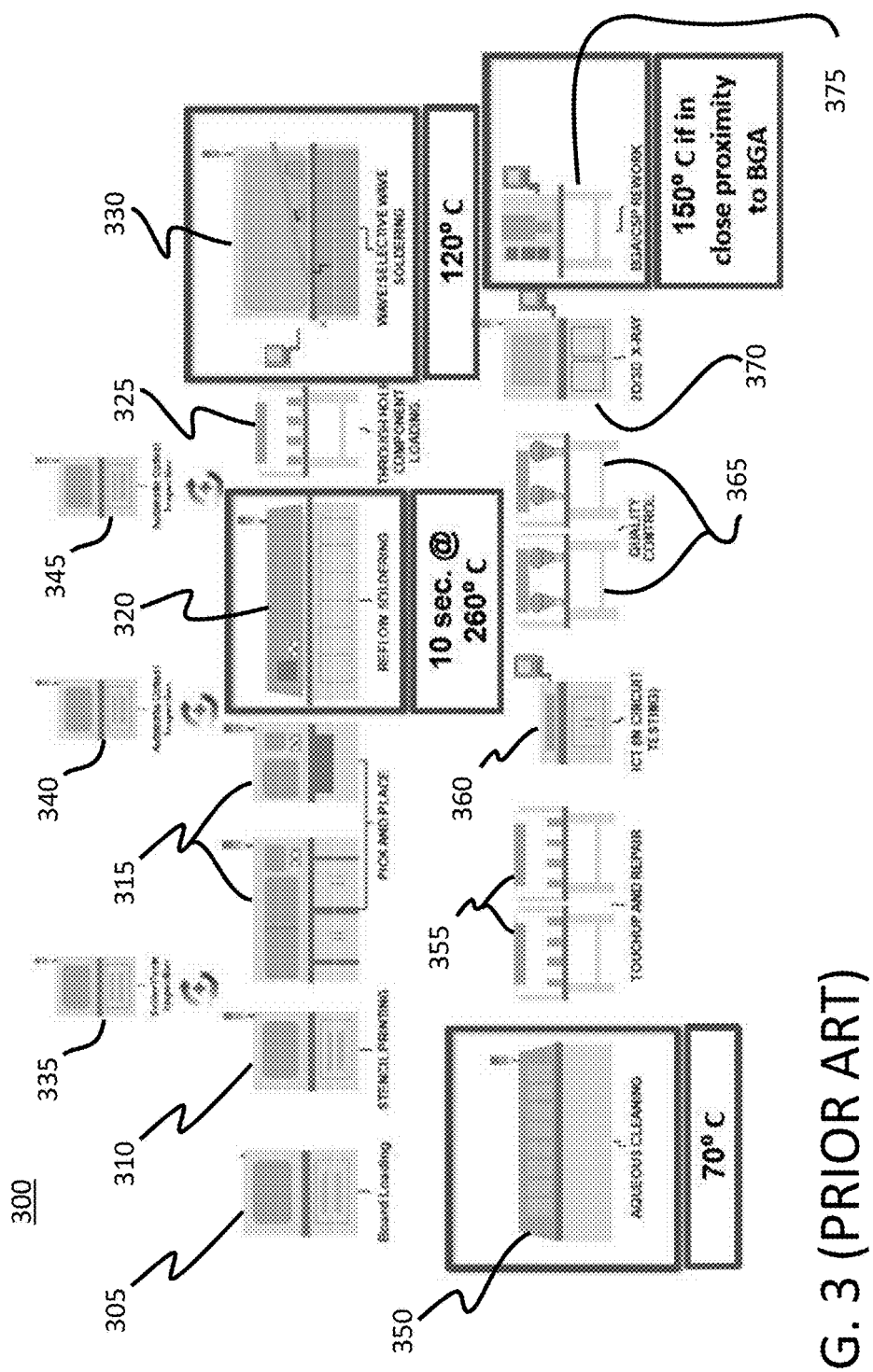
FIG. 3 illustrates processes of an SMT assembly line.

FIG. 3 illustrates various processes, any or all of which may be found in a conventional SMT assembly line 300. The high-temperature processes are highlighted with a rectangular border and a brief description of the environment in which the process occurs. The assembly line begins at the left, where the PCB is loaded into the assembly line, 305. A stencil printing process follows, 310, in which a solder paste is applied to electrically conductive pads on the PCB to which SMT components will be attached. Then, the components are picked and placed onto the board, 315, where they are temporarily held in place by the solder paste. After component placement, the board is heated to accomplish reflow soldering, 320, a process that typically heats the board to a high temperature in a controlled environment for a brief period, such as a temperature of 260° C. for ten seconds. Through-hole components may then be placed on the board, 325, and permanently attached to the board in a wave/selective wave soldering process, 330, that heats the board to 120° C. Although only one each of the reflow soldering and wave soldering processes are shown, the assembly of a complex PCBA may require a plurality of one or both processes to be used in the assembly line. Ancillary processes generally include inspection of the solder paste before it is applied to the board, 335, and automatic optical inspection before, 340, and/or after, 345, the reflow soldering process is accomplished. Additional processes may be included in the assembly line, or may be applied to a sampling of boards before, during, or after assembly. These processes may include aqueous cleaning using hot water, 350, for example at a temperature of 70° C.; touchup and repair of defective PCBAs, 355; in circuit testing (ICT), 360; and various quality control (QC) processes, 365. Such QC processes can include visual inspection, microscopic inspection, 2D and/or 3D x-ray inspection, 370, and the like. Ball grid array (BGA)/chip-scale package (CSP) rework may also be applied, 375. If so, the rework may heat the portion of the board in close proximity to the BGA or CSP to 150° C.

To track the progress of a PCB as it moves through a SMT assembly line, a printable barcode label that contains an RFID chip, antenna and a shield may be applied to the PCB. The label is configured under illustrative embodiments to withstand the temperature of multiple reflow soldering processes in the assembly line and continue to function reliably and accurately without radio frequency interference or catastrophic failure from parasite signals from other components on the board or from the environment other than those intended by the user to communicate with the internal systems of the component. The label can be affixed to the PCB before or at the time it is introduced into the assembly line at 305. Thereafter, the label may be used to track the PCB as it moves through the assembly line. Because RFID and barcode are both provided by the label, the PCB may be tracked visually via the barcode when it is convenient to do so, and may be tracked via radio frequency signals when that is more convenient, for example, in a process in which a line of sight to the barcode is not available.

The RFID capability of the label may additionally be used after the PCB assembly is completed. For example, after the PCBA is incorporated into a product as a component in the product's production line, the RFID still attached to the PCBA can be used to track the product through the remainder of its production line. Furthermore, the RFID can thereafter be used to track the product even after its manufacture is completed, through the product packaging and shipping processes and beyond.

Figure 4:
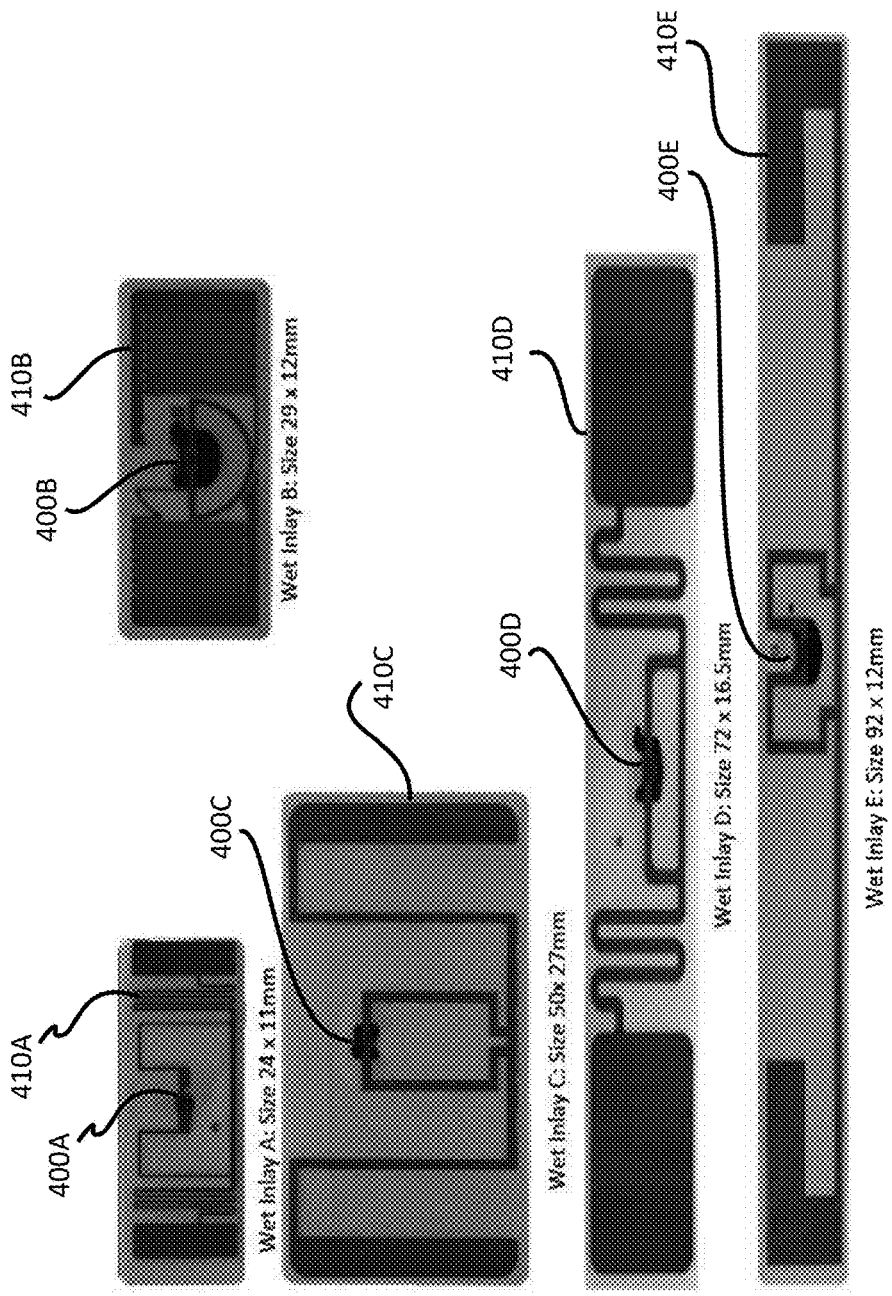
FIG. 4 shows a plurality of RFID inlays under illustrative embodiments of various sizes and configurations.

FIG. 4 shows a plurality of RFID inlays of various sizes and configurations that may be included in a label and attached to a PCB. RFID inlays comprise an integrated circuit (IC) (400A-E) electrically coupled to a dipole antenna (410A-E), encased in a protective package. RFID inlays can be either "wet" or "dry". Wet inlays have a bottom surface with an adhesive backing, whereas dry inlays do not have adhesive backing. In either case, the inlay is attached or bound to the bottom surface of a label substrate, which generally has an adhesive backing. The bottom surface of the substrate adheres to the top surface of the inlay. The fully formed label with a wet inlay thus has a continuous adhesive backing on its bottom surface, while a label with a dry inlay does not.

Figure 5:
FIG. 5 shows a conventional RFID tag printer.

The top surface of the label substrate is printable. The complete label containing the inlay may be sized and configured to be printed using a particular type of conventional RFID printer. An RFID printer is a thermal printer that programs the RFID chip contained in the label and prints a machine readable bar code and optionally human-readable alphanumeric characters, all in a single operation. A conventional RFID printer, 500, is shown in FIG. 5, outputting a prior art RFID label, 510, that has just been programmed and printed. In a preferred embodiment, a reflow solder process-tolerant ("reflowable") RFID printable label is configured to work with a conventional RFID printer as a drop in replacement for conventional lower-temperature RFID labels, 510, with little or no adjustment to the label printer when switching between reflowable RFID label stock and conventional RFID label stock.

Antennas and shielding may be made of essentially any high electrical conductivity material that can be formed into an appropriate shape and size. Each different material provides very specific read and write and shielding characteristics because of the different electrical properties, which affects the speed and distance from which the RFID can be read. The read distance and speed are also highly dependent of the size and shape of the RFID antenna and its orientation relative to an RFID reader. High conductivity materials may be more expensive than lower conductivity materials, but RFID made from such materials may be read faster and from further away than similarly configured lower conductivity materials. In embodiments, the antenna configuration and orientation, and the materials and used to make it, may be selected to provide the least expensive sufficiently functional RFID solution for a particular application.

In some illustrative embodiments, single or multi-band rejection EMI shields for RFID elements may be realized utilizing on screen-printing of conductive patterns (e.g., concentric rings on a single layer), which makes the shield thin and highly flexible. In some illustrative embodiments, fabrication of the printed EMI shield may be accomplished utilizing silver ink or other suitable material, where the EMI shield may be applied. with screen-printing. In some illustrative embodiment, roll-by-roll printing may be used for applying a shield.

Figure 6:
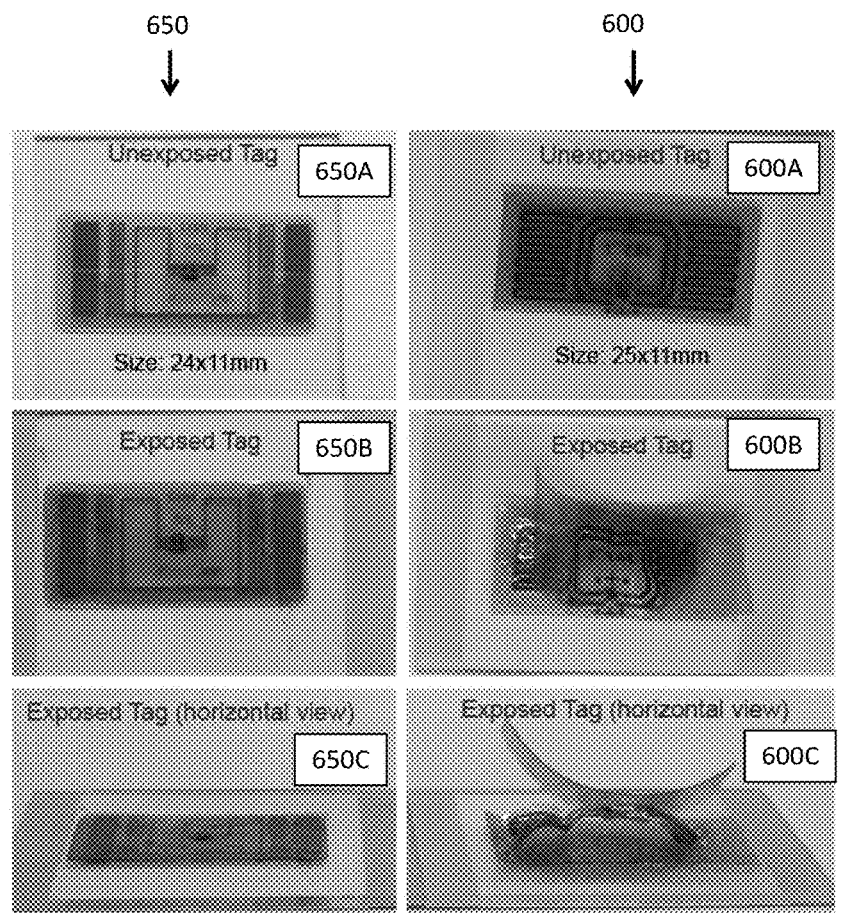
FIG. 6 shows an exemplary disclosed tag (left) and a prior art tag (right) before and after exposure to temperatures of a reflow soldering process of an SMT assembly line.

FIG. 6 shows a comparison of a conventional prior art RFID tag, 600, (at the right of the figure), versus a reflowable RFID tag, 650, that may include a shield in accordance with the disclosure (at the left of the figure). Three views of each tag are shown: a top view of the tags (600A, 650A) unexposed to reflow soldering temperatures (at the top of the figure), and top (600B, 650B) and perspective (600C, 650C) views of exposed RFID tags (at the center and bottom of the figure, respectively). As can be seen, the conventional tag, 600, did not survive the exposure at all. Not only was it physically compromised as can be seen from the figure, but tests showed it was nonfunctional as well. In contrast, the RFID tag produced in accordance with the disclosure, 650, was not substantially compromised either physically or functionally although significant optimization is still needed in order for it to function in accordance with this disclosure.

In an exemplary embodiment, a label may be fabricated with an integrated RFID chip mounted on a substrate, with an antenna either plated on or etched into the substrate. These RFID components may then be packaged with one or more layers of materials able to withstand multiple exposures to reflow solder temperatures, as well as normal ambient exposure conditions and, if the RFID is to provide ongoing tracking and functionality, exposure to ambient conditions during storage, transport, and usage of the product. The top surface of the label is printable, and a barcode and/or other symbols such as alphanumeric characters, a QR code or other 2D or 3D identifying marker, and the like, can be printed on it using a conventional barcode printer.

In another illustrative embodiment, a label is fabricated on a reflowable substrate by printing RFID elements on the substrate with special purpose inks. An all-printed RFID circuit may be created using semiconducting inks. The semiconducting inks can comprise small molecule materials such as pentacene, inorganic semiconductors such as silicon precursors, solution processable metal oxides such as silver oxides, and/or polymer semiconducting materials such as polythiophene. An all-printed RFID antenna coupled to the RFID circuit may be created using electrically conductive inks comprising (but not limited to) metal filled epoxies, carbon nanotubes, graphene, polyaniline, and/or an electrically conducting polymer. Protective layers can similarly be fabricated on the substrate to create the RFID label. As before, the top surface of the label is printable, and a barcode can be printed on it using a conventional barcode printer.

Although the disclosure has been described and illustrated in exemplary forms with a certain degree of particularity, it is noted that the description and illustrations have been made by way of example only. Numerous changes in the details of construction, combination, and arrangement of parts and steps may be made. Accordingly, such changes are intended to be included within the scope of the disclosure and the described exemplary embodiments.

What is claimed is:

1. A surface mount technology (SMT)-compatible barcode-printable radio frequency identification (RFID) label configured to be attached to a printed circuit board (PCB) work piece for tracking the work piece through an assembly line that includes at least one reflow solder process, comprising:
   a high temperature label substrate for providing tolerance from the reflow solder process, the high temperature label substrate comprising a printable top surface and configured to receive adhesive on a bottom surface for coupling to the PCB work piece;
   an RFID semiconductor circuit (IC) coupled to the substrate;
   an electrically conductive RFID antenna coupled to the substrate and electrically coupled to the IC;

a layer of shielding material coupled to the substrate, wherein the shielding material is configured to reduce radio frequency interference;

packaging configured around the substrate, the IC, and the antenna to form an RFID label; and a barcode printed on the printable top surface of the label.

2. The label of claim 1, wherein the barcode is configured to be printed on the high temperature label substrate prior to the substrate being coupled to the PCB work piece.

3. The label of claim 1, wherein the RFID IC is configured to be programmed with RFID information, and wherein at least one of the printed bar code and the RFID information is configured to be readable before and after each stage of a lead-free SMT process.

4. A label configured to be attached to an item of manufacture for tracking the item through surface mount technology (SMT) manufacturing process comprising at least one reflow soldering process, the label comprising:

a substrate comprising a printable surface configured to receive a printed marker comprising visually readable identification data;

an RFID circuit, coupled to the substrate, configured to be programmed with identifying information;

an RFID antenna coupled to the substrate and electrically coupled to the RFID circuit; and protective packaging comprising (i) a surface configured to receive an adhesive for coupling the surface to the item of manufacture, and (ii) a layer of shielding material coupled to the substrate, wherein the protective packaging is arranged to protect the RFID circuit and antenna from environmental conditions including heat and radio frequency interference throughout the SMT manufacturing process;

wherein the RFID circuit is printed using semiconductor ink and the RFID antenna is printed using electrically conducting ink.

5. The label of claim 4, wherein the label is configured to be printed and programmed in a RFID printer.

6. The label of claim 4, wherein the RFID circuit comprises semiconducting materials in the form of a chip, the RFID antenna comprises a conductive metal, and the chip and antenna are configured to be electrically coupled together and wrapped in at least a portion of the packaging as an inlay.

7. The label of claim 6, wherein the chip, the antenna, and the packaging are formed by coupling the inlay to the substrate.

8. The label of claim 4, wherein the semiconductor ink includes at least one of a small molecule material, an inorganic semiconductor, a solution-processable metal oxide, and a polymer semiconducting material.

9. The label of claim 8, wherein the small molecule material comprises pentacene, the inorganic semiconductor comprises a silicon precursor, the solution processable metal oxide comprises silver oxide, and the polymer semiconducting material comprises polythiophene.

10. The label of claim 4, wherein the electrically conducting ink comprises at least one of a metal filled epoxy, carbon nanotubes, graphene, polyaniline, and an electrically conducting polymer.

11. The label of claim 4, wherein the protective packaging comprises protective layers fabricated on the substrate to form a RFID label.

12. A method for forming a surface mount technology (SMT)-compatible barcode-printable radio frequency identification (RFID) label configured to be attached to a printed circuit board (PCB) work piece for tracking the work piece through an assembly line that includes at least one reflow solder process, comprising:

coupling an RFID semiconductor circuit (IC) coupled to a high temperature label substrate for providing tolerance from the reflow solder process;

coupling the high temperature label substrate to the PCB work piece vi an adhesive on a bottom surface of the high temperature label substrate;

coupling an RFID semiconductor circuit (IC) to the substrate;

coupling an electrically conductive RFID antenna to the substrate and electrically coupling the conductive RFID antenna to the IC;

coupling a layer of shielding material to the substrate, wherein the shielding material is configured to reduce radio frequency interference;

applying packaging around the substrate, the IC, and the antenna to form an RFID label; and printing a barcode on a printable top surface of the label.

13. The method of claim 12, further comprising printing the barcode on the high temperature label substrate prior to the substrate being coupled to the PCB work piece.

14. A method for forming a surface mount technology (SMT)-compatible barcode-printable radio frequency identification (RFID) label configured to be attached to a printed circuit board (PCB) work piece for tracking the work piece through an assembly line that includes at least one reflow solder process, comprising:

coupling an RFID semiconductor circuit (IC) coupled to a high temperature label substrate for providing tolerance from the reflow solder process;

coupling the high temperature label substrate to the PCB work piece vi an adhesive on a bottom surface of the high temperature label substrate;

coupling an RFID semiconductor circuit (IC) to the substrate;

coupling an electrically conductive RFID antenna to the substrate and electrically coupling the conductive RFID antenna to the IC;

coupling a layer of shielding material to the substrate, wherein the shielding material is configured to reduce radio frequency interference;

applying packaging around the substrate, the IC, and the antenna to form an RFID label; and programming the RFID IC with RFID information, and wherein at least one of the printed bar code and the RFID information is configured to be readable before and after each stage of a lead-free SMT process.

15. A method for forming a surface mount technology (SMT)-compatible barcode-printable radio frequency identification (RFID) label configured to be attached to a printed circuit board (PCB) work piece for tracking the work piece through an assembly line that includes at least one reflow solder process, comprising:

coupling an RFID semiconductor circuit (IC) coupled to a high temperature label substrate for providing tolerance from the reflow solder process;

coupling the high temperature label substrate to the PCB work piece vi an adhesive on a bottom surface of the high temperature label substrate;

coupling an RFID semiconductor circuit (IC) to the substrate;

coupling an electrically conductive RFID antenna to the substrate and electrically coupling the conductive RFID antenna to the IC;

coupling a layer of shielding material to the substrate, wherein the shielding material is configured to reduce radio frequency interference;

applying packaging around the substrate, the IC, and the antenna to form an RFID label; and printing the RFID circuit using semiconductor ink and printing the RFID antenna using electrically conducting ink.

16. The method of claim 15, wherein the semiconductor ink comprises at least one of a small molecule material, an inorganic semiconductor, a solution-processable metal oxide, and a polymer semiconducting material.

17. The method of claim 15, wherein the electrically conducting ink comprises at least one of a metal filled epoxy, carbon nanotubes, graphene, polyaniline, and an electrically conducting polymer.

* * * * *